United States Patent [19]

Watanabe

[11] Patent Number: 4,837,806

[45] Date of Patent: Jun. 6, 1989

[54] DATA COMMUNICATION PROCESS SUITABLE FOR USE IN A QUIET ENVIRONMENT

[75] Inventor: Tsunehiro Watanabe, Tokyo, Japan

[73] Assignee: Canon Kabushiki Kaisha, Tokyo, Japan

[21] Appl. No.: 17,600

[22] Filed: Feb. 24, 1987

[30] Foreign Application Priority Data

Feb. 27, 1986 [JP] Japan ................. 61-042153

[51] Int. Cl.$^4$ .......................................... H04M 11/00
[52] U.S. Cl. ...................................... 379/93; 379/100
[58] Field of Search ............. 379/96, 100, 107, 98, 379/93; 358/257

[56] References Cited

U.S. PATENT DOCUMENTS

| | | | |
|---|---|---|---|
| 3,586,778 | 6/1971 | Riethmeier et al. | 379/100 X |
| 3,824,334 | 7/1974 | Jacobson et al. | 358/257 |
| 3,914,539 | 10/1975 | Hashimoto | 358/257 |
| 4,160,874 | 7/1979 | Ollinger | 358/257 X |
| 4,469,917 | 9/1984 | Shelley | 379/107 |
| 4,503,288 | 3/1985 | Kessler | 379/96 X |
| 4,578,700 | 3/1986 | Roberts et al. | |
| 4,639,553 | 1/1987 | Kiguchi | 379/100 X |

FOREIGN PATENT DOCUMENTS 2099260 12/1982 United Kingdom ................ 379/107

Primary Examiner—Keith E. George
Attorney, Agent, or Firm—Fitzpatrick, Cella, Harper & Scinto

[57] ABSTRACT

A data communication apparatus includes a data communication unit for performing data communication; a setting unit for setting the apparatus in an automatic communication mode; an information unit responsive to a calling signal coming from a line for informing of the incoming of a calling signal using a sound; and a control unit for making the information unit not responsive to the calling signal from the line during the automatic communication mode and automatically performing data communication using the data communication means.

6 Claims, 4 Drawing Sheets

DATA COMMUNICATION PROCESS SUITABLE FOR USE IN A QUIET ENVIRONMENT

BACKGROUND OF THE INVENTION

1. Field of the Invention

The present invention relates to a data communication apparatus having an automatic communication function.

2. Related Background Art

Some apparatuses of this type, for example, facsimile machines have an automatic response function. In this type of facsimile machine, a telephone set and a facsimile are separately provided.

When a calling signal comes to a facsimile which is set at an auto response mode, a ringer circuit at the telephone set is actuated to produce a calling sound.

Therefore, such a facsimile machine is not suitable for a quiet environment, such as at home at night.

SUMMARY OF THE INVENTION

It is an object of the present invention to eliminate the above-described problems.

It is a further object of the present invention to improve a data communication apparatus.

It is a still further object of the present invention to provide a data communication apparatus which is usable even in a quiet environment.

It is another object of the present invention to provide a data communication apparatus which does not produce a calling sound when in an automatic communication mode even when a calling signal is received.

Other objects of the present invention will become apparent from the following detailed description.

DETAILED DESCRIPTION OF THE PREFERRED EMBODIMENTS

The preferred embodiments of this invention will be described in detail with reference to the accompanying drawings.

Figure 1:
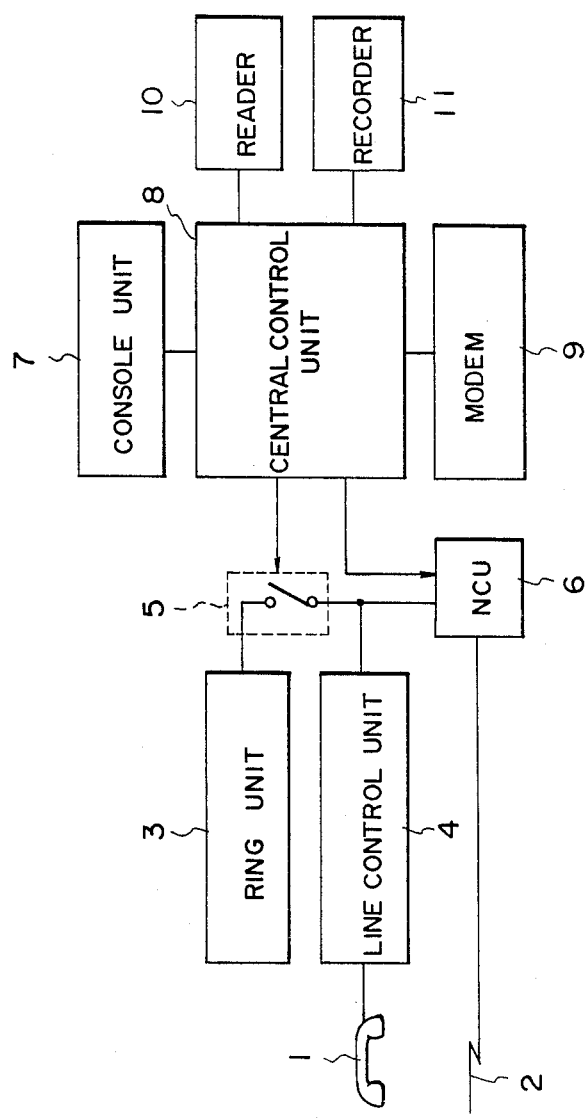
FIG. 1 is a block diagram showing the construction of a first embodiment of the present invention.

FIG. 1 is a block diagram showing the first embodiment of the present invention.

The embodiment comprises a telephone set (or hand set) 1 for use in speech, a telephone line 2, a ring unit 3 which rings when a calling signal comes from the telephone line 2, a line control unit 4 for switching signals on the line 2 to the hand set 1 during speech, and a relay 5 for releasing or connecting the ring unit 3 with respect to a calling signal from the line 2 via a network control unit (NCU) 6 which controls the connection between the telephone line 2 and the present apparatus.

The embodiment further comprises a console unit 7 for performing various inputs, a central control unit 8 for controlling the entirety of this apparatus, a modulator/demodulator 9 for modulating or demodulating facsimile signals, a reader 10 and a recorder 11.

The NCU 6 detects a calling signal from the line 2 and informs the central control unit 8 of that fact.

The operation of this embodiment will be described.

Figure 3:
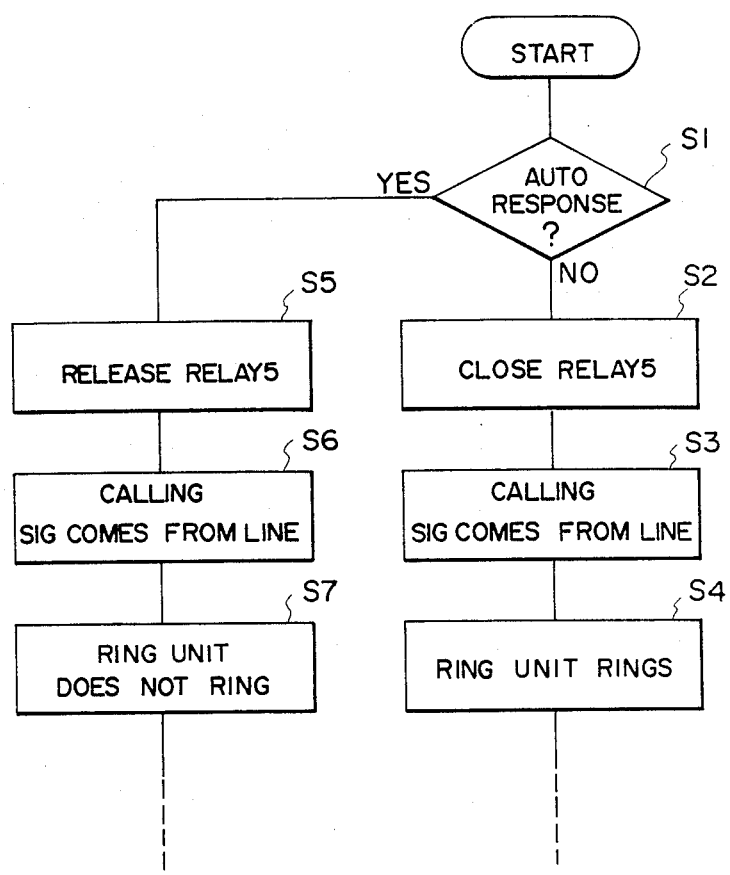
FIG. 3 is a flow chart showing the operation of the first embodiment.

FIG. 3 is a flow chart showing the operation of the central control unit 8 of this embodiment.

First, if the facsimile machine is set in a manual mode by means of the console unit 7 (NO in step S1), the central control unit 8 instructs closing of the relay 5 (S2). When a calling signal comes from the telephone line 2 after the relay 5 is closed (S3), the ring unit 3 produces a calling sound to inform the central control unit 8 of the arrival of a calling signal.

On the other hand, if the facsimile machine is set in an auto response mode (YES in step S1), the central control unit 8 instructs release of the relay 5 (S5). Even if a calling signal comes from the telephone line 2 after the relay 5 is released (S6), the ring unit 3 does not produce a calling sound (S7). Thus, the present machine is usable in a quiet environment such as at home at night.

Figure 2:
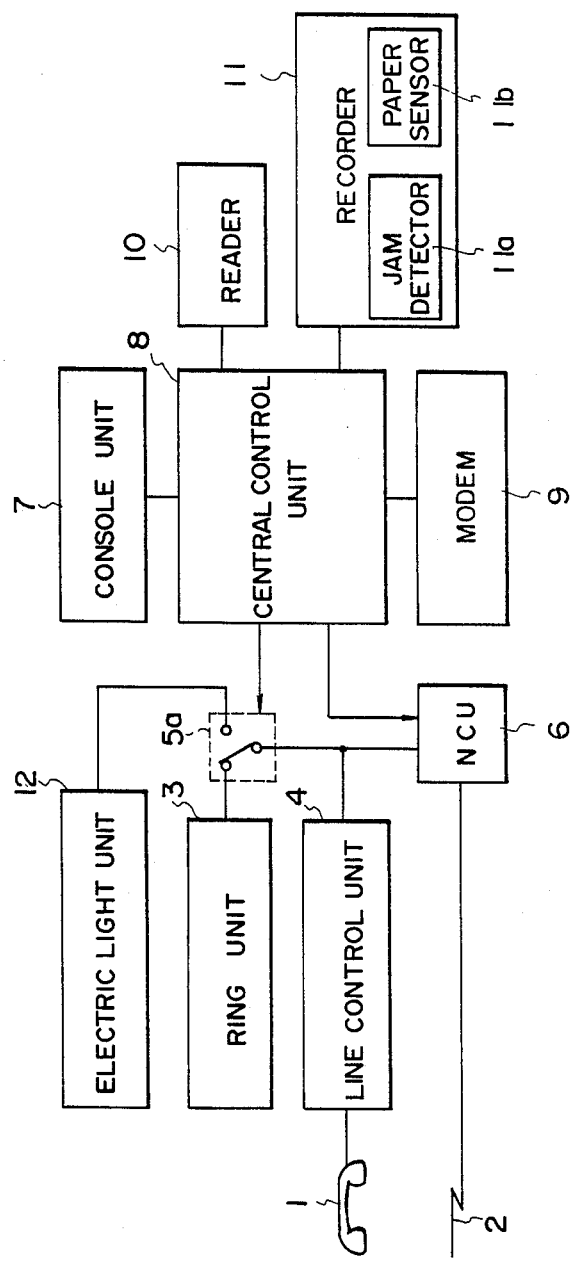
FIG. 2 is a block diagram showing the construction of a second embodiment.

FIG. 2 is a block diagram showing another embodiment of this invention.

In this embodiment, besides the construction of FIG. 1, an electric light unit 12 for converting a calling signal into light, and a relay 5a in place of the relay 5, are provided. The relay 5a switches a calling signal from the telephone line 2 to either the ring unit 3 or the electric light unit 12.

First, if this machine is set in a manual mode by means of the console unit 7, the central control unit 8 causes the relay 5a to be connected to the ring unit 3. In this case, when a calling signal comes from the telephone line 2, the ring unit 3 rings.

On the other hand, if the machine is set in an auto response mode by means of the console unit 7, the central control unit 8 causes the relay 5a to be connected to the electric light unit 12. In this case, the electric unit 12 emits light to inform a nearby person of the incoming of a calling signal. Thus, the machine is usable in a quiet environment such as at home at night.

In the embodiment shown in FIG. 2, a manual switch may be used instead of the relay 5a. In this case, it is necessary for the operator to handle the manual switch.

Figure 4:
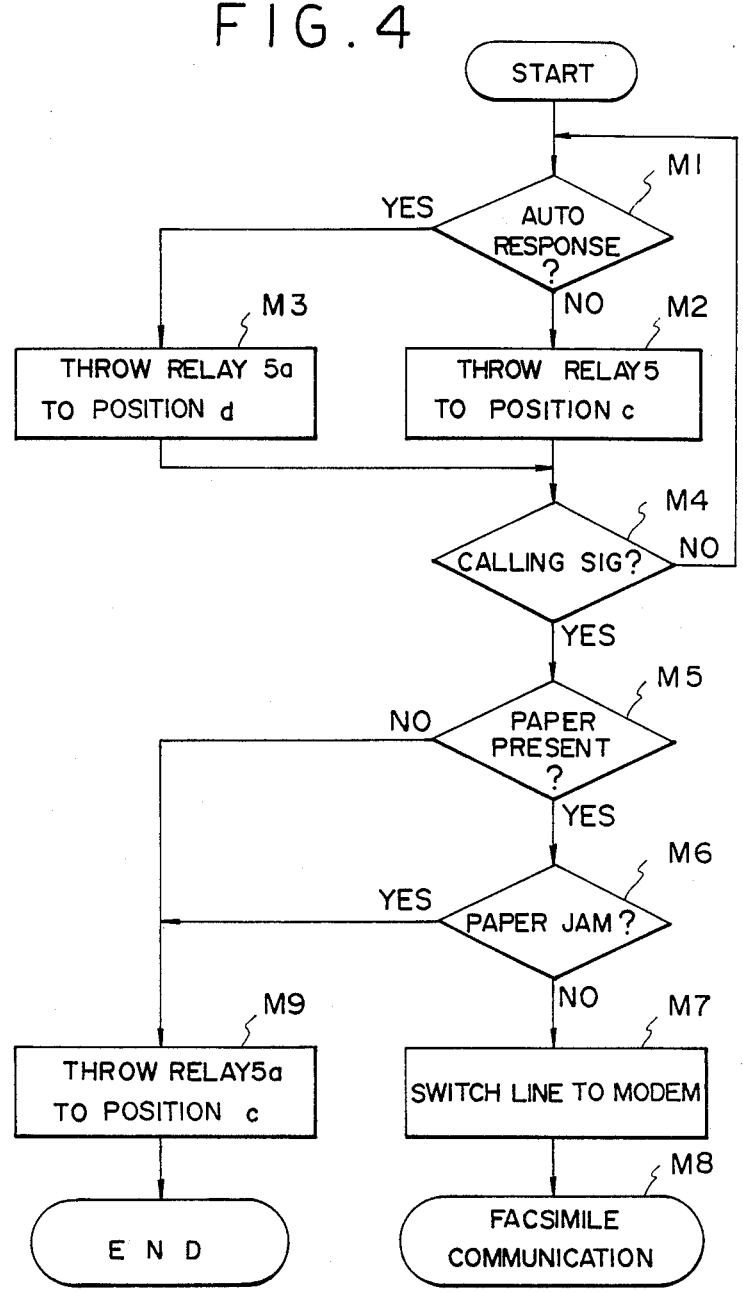
FIG. 4 is a flow chart showing the operation of the second embodiment.

FIG. 4 is a flow chart showing the control operation of the central control unit 8 in the second embodiment. The central control unit 8 is constructed of microcomputer peripheral devices such as a microcomputer, read-only memory (ROM), random access memory (RAM) and so on. Control programs for executing the operation shown in the flow chart of FIG. 4 are stored in ROM of the central control unit 8.

First, at step M1, it is checked if an auto response switch (not shown) on the console unit 7 is turned on to cause the apparatus to be set in an automatic communication mode (auto response mode). If YES at step M1, the flow advances to step M3 where the relay 5a is thrown to position d indicating the electric light unit 12 side. If NO at step M1, the flow advances to step M2 where the relay 5a is thrown to position C, indicating the ring unit 3 side.

Next, at step M4, it is checked if a calling signal from the line 2 is being detected by calling signal detector (not shown) provided in the NCU 6. In this case, the line 2 is being switched to the hand set side by a circuit relay of the NCU 6. If a calling signal is not detected at step M4, then the flow returns to step M1.

If a calling signal is detected at step M4, the flow advances to step M5 where it is checked if recording paper is present on the recorder 11. Presence or absence of recording paper is detected based on a signal from a recording paper sensor 11b provided in the recorder 11. If recording paper is not present at step M5, the control advances to step M9 where the relay 5a is thrown to position c. If recording paper is present, the control advances to step M6 where it is checked if a paper jam is present based on an output from a jam detector 11a provided in the recorder 11. If there is a paper jam at step M6, the control advances to step M9, and if not, to step M7. At step M7, a circuit relay in the NCU 6 is thrown to the modulator/demodulator (modem) 9 side from the hand set side to carry out facsimile communication at step M8 and succeeding steps.

As described so far, according to the second embodiment, the central control unit 8 causes the relay 5a to be thrown to the electric light unit during the automatic communication mode, whereas it causes the relay 5a to be thrown to the ring unit during the manual communication mode. When a calling signal comes from the line 2, the electric light unit 12 is driven during the automatic communication mode, and the ring unit 3 is driven during the manual communication mode.

Further, in the second embodiment, even if the machine is set in the automatic communication mode, the relay 5a is thrown to the ring unit 3 side in the case of no recording paper or paper jam. Consequently, the operator can be informed immediately that there is no recording paper without providing a dedicated device for informing him or her of such abnormal condition.

The present invention is applicable not only to the facsimile machine but also to other data communication apparatus which can send image signals.

I claim:

1. A data communication apparatus comprising:
   data communication means for performing data communication;
   setting means for setting said apparatus in an automatic communication mode;
   information means responsive to a calling signal coming from a line for informing an operator of an incoming call, using a sound;
   detection means for detecting malfunction of said data communication means; and
   control means for disabling said information means from performing its informing function in response to the calling signal from the line while said apparatus is in the automatic communication mode and for automatically performing data communication using said data communication means,
   wherein said control means controls said information means to be activated when said detection means detects malfunction while said apparatus is in the automatic communication mode.

2. A data communication apparatus according to claim 1, wherein the control means prevents supplying said calling signal from the line to said information means while said apparatus is in the automatic communication mode.

3. A data communication apparatus according to claim 1, further comprising display means for displaying that said calling signal is coming from the line, and wherein said control means controls said display means to be activated while said apparatus is in the automatic communication mode.

4. A data communication apparatus according to claim 1, wherein said information means is a ringer.

5. A data communication apparatus according to claim 1, wherein said data communication means has means for recording data on a recording paper and said detection means detects the absence of the recording paper in said recording means.

6. A data communication apparatus according to claim 1, wherein said data communication means has means for recording data on a recording paper and said detection means detects a jam of the recording paper in said recording means.

* * * * *